United States Patent
Hart et al.

(10) Patent No.: US 7,948,991 B1
(45) Date of Patent: May 24, 2011

(54) BROADCAST AND MULTICAST TRANSMISSIONS WITH ACKNOWLEDGEMENT SCHEDULING

(75) Inventors: Brian Donald Hart, Sunnyvale, CA (US); Lu Qian, Solon, OH (US)

(73) Assignee: Cisco Technology, Inc., San Jose, CA (US)

(*) Notice: Subject to any disclaimer, the term of this patent is extended or adjusted under 35 U.S.C. 154(b) by 93 days.

(21) Appl. No.: 12/283,831

(22) Filed: Sep. 16, 2008

Related U.S. Application Data

(60) Provisional application No. 61/051,928, filed on May 9, 2008.

(51) Int. Cl.
*H04L 12/28* (2006.01)
*G06F 9/46* (2006.01)

(52) U.S. Cl. .................. 370/395.4; 718/102

(58) Field of Classification Search .......... None
See application file for complete search history.

(56) References Cited

U.S. PATENT DOCUMENTS

| | | | |
|---|---|---|---|
| 7,075,906 B2 | 7/2006 | Douglas et al. | |
| 7,197,013 B2 | 3/2007 | Douglas et al. | |
| 2005/0018624 A1 | 1/2005 | Meier et al. | |
| 2006/0034313 A1* | 2/2006 | Aaltonen | 370/432 |
| 2006/0154603 A1* | 7/2006 | Sachs et al. | 455/39 |
| 2007/0037548 A1 | 2/2007 | Sammour et al. | |
| 2007/0189207 A1* | 8/2007 | Sammour et al. | 370/328 |
| 2007/0201468 A1* | 8/2007 | Jokela | 370/390 |
| 2007/0230493 A1* | 10/2007 | Dravida et al. | 370/412 |
| 2007/0274246 A1* | 11/2007 | Stephens | 370/312 |
| 2008/0112350 A1* | 5/2008 | Nanda et al. | 370/312 |

* cited by examiner

*Primary Examiner* — Hong Cho
*Assistant Examiner* — Eunsook Choi
(74) *Attorney, Agent, or Firm* — Cindy Kaplan

(57) ABSTRACT

In one embodiment, a method includes scheduling acknowledgements from a plurality of receivers in a wireless network, transmitting an acknowledgement schedule to the receivers, broadcasting or multicasting data to the receivers, processing acknowledgements received from receivers, and retransmitting at least a portion of the data to one or more of the receivers if an acknowledgement is not received from the one or more receivers. An apparatus for broadcasting or multicasting data in a wireless network is also disclosed.

21 Claims, 7 Drawing Sheets

BROADCAST AND MULTICAST TRANSMISSIONS WITH ACKNOWLEDGEMENT SCHEDULING

STATEMENT OF RELATED APPLICATION

The present application claims priority from U.S. Provisional Application No. 61/051,928, entitled Efficient and Reliable Broadcasting/Multicasting and Reception Acknowledgement, and filed on May 9, 2008. The contents of this provisional application are incorporated herein by reference in its entirety.

BACKGROUND OF THE INVENTION

The present disclosure relates generally to communication networks, and more particularly, to broadcast and multicast transmissions in a wireless communication network.

IEEE is currently investigating the use of broadcast and multicast for transmittal of video data. Packet loss rate (PLR) requirements for video data are very stringent. Retransmission capability is therefore required. In order to trigger a retransmission, a transmitter uses a pass/absence-of-pass indication from a receiver (acknowledgement (ACK)/ACK not received within an expected duration).

Conventional wireless communication networks operating in accordance with IEEE 802.11 allow only one ACK to immediately follow a data frame. Conventional networks thus do not allow for acknowledgement of multicast or broadcast data, since the transmitting device would need to confirm that multiple intended receivers received the multicast or broadcast data.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises scheduling acknowledgements from a plurality of receivers in a wireless network, transmitting an acknowledgement schedule to the receivers, broadcasting or multicasting data to the receivers, processing acknowledgements received from the receivers, and retransmitting at least a portion of the data to one or more of the receivers if acknowledgements are not received from one or more of the receivers.

In another embodiment, an apparatus generally comprises a scheduler operable to schedule acknowledgements from a plurality of receivers and generate an acknowledgement schedule, a transmitter configured for broadcasting or multicasting data to the receivers and transmitting the acknowledgement schedule to the receivers, a processor operable to process acknowledgements received from the receivers, and a controller configured to arrange for retransmittal of at least a portion of the data to one or more of the receivers if acknowledgements are not received from one or more of the receivers.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Embodiments described herein provide a more reliable and efficient multicast/broadcast (MC/BC) data stream for wireless transmission between wireless devices. Although having very broad applicability, the embodiments are described herein with reference to a representative network environment, a wireless communication network based on the IEEE 802.11 standard, and in one particular implementation, the IEEE 802.11n amendment to the 802.11 standard. As described in detail below, embodiments allow for transmittal of data from a transmitter (source device) to a plurality of receivers (destination devices) with scheduled acknowledgements from the destination devices and retransmittal of data as required.

Figure 1:
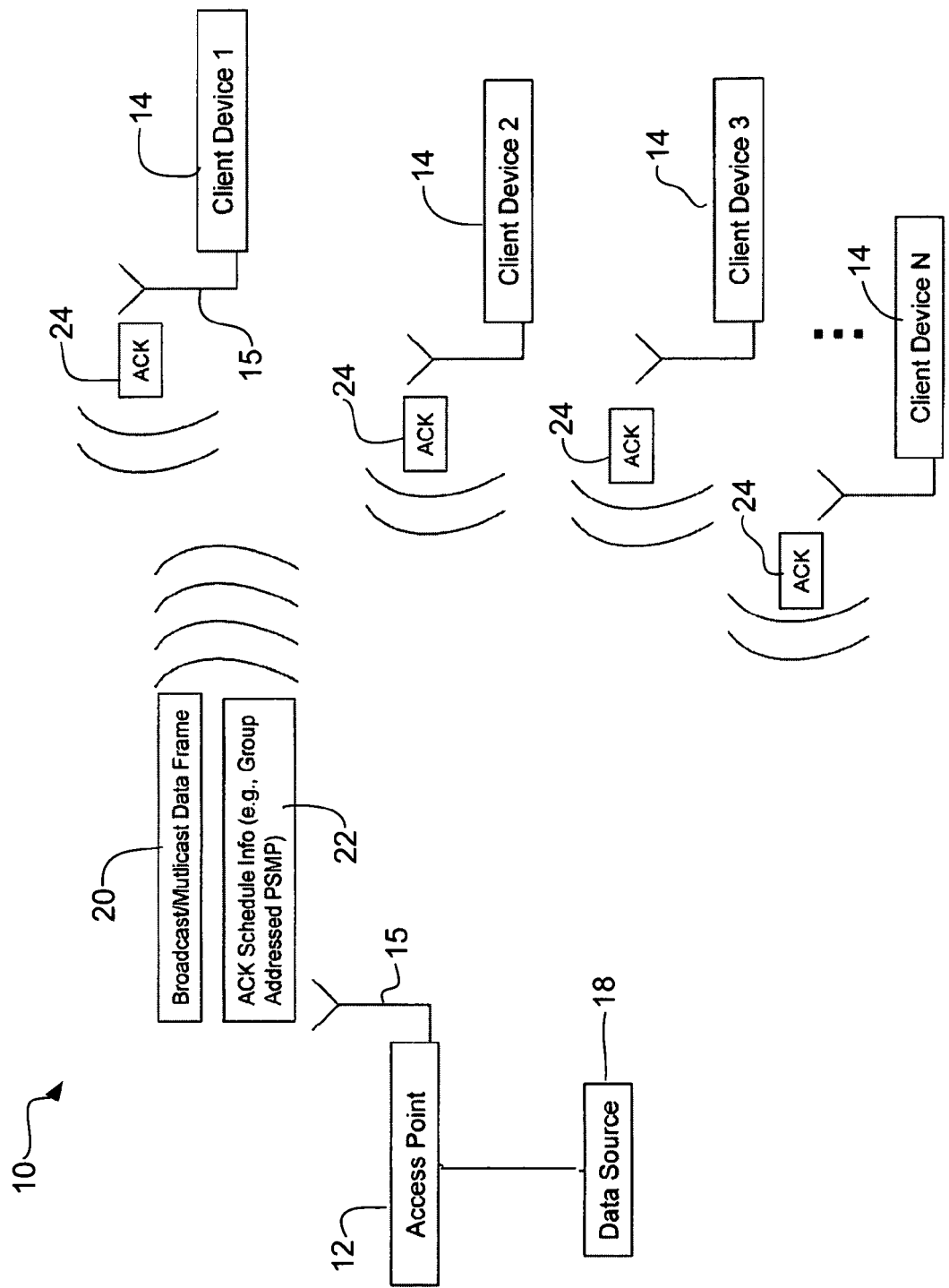
FIG. 1 illustrates an example of a wireless network in which embodiments described herein may be implemented.

Referring now to the drawings, and first to FIG. 1, an example of a wireless network 10 suitable for implementing embodiments described herein is shown. Included within wireless network 10 are an access point (AP) 12 and a plurality of destination devices (receivers) 14. The AP may be a base station, site controller, or any other type of interfacing device in a wireless environment. The destination devices may be user equipment, mobile stations (STAs), fixed or mobile subscriber units, or any other type of device capable of operating in a wireless environment (e.g., wireless transmit/receive unit). In the example of FIG. 1, the destination devices include client device 1, client device 2, client device 3 . . . client device N. The AP 12 and client devices 14 are equipped with antennas 15. Although the AP 12 is referred to herein as a transmitter, since it broadcasts or multicasts data to the destination devices (receivers) 14, both the AP and the destination devices are configured to transmit and receive data. For example, the AP may transmit video or audio traffic and receive acknowledgements, while the destination devices receive the video or audio traffic and transmit acknowledgements.

In one embodiment, the AP 12 and client devices 14 communicate in accordance with IEEE 802.11 standard, including for example, IEEE 802.11n. The network may transfer video or other forms of high data rate traffic such as audio, or any other type of data traffic. The data to be broadcast/multicast may originate from a data source 18 that provides the data to the AP 12 locally or remotely via a network (e.g., the Internet, or a combination of networks (e.g., Internet and local area networks)).

As described in detail below, the AP 12 transmits an acknowledgement schedule 22 and broadcasts or multicasts data 20 and to the client devices 14 (FIG. 1). The client devices 14 respond by each transmitting an acknowledgement 24 according to the schedule 22 received from the AP 12.

It is to be understood that the network shown in FIG. 1 is only one example and that networks having different components or arrangement, or operating in accordance with other communication protocols may also be used without departing from the scope of the invention. For example, while the embodiments described herein are in the context of an AP broadcasting/multicasting data to multiple client devices, the embodiments are more generally applicable to any wireless device broadcasting/multicasting data to any other group of wireless devices, where the wireless devices operate in accordance with a set of rules governing access to a transmission medium.

Figure 2:
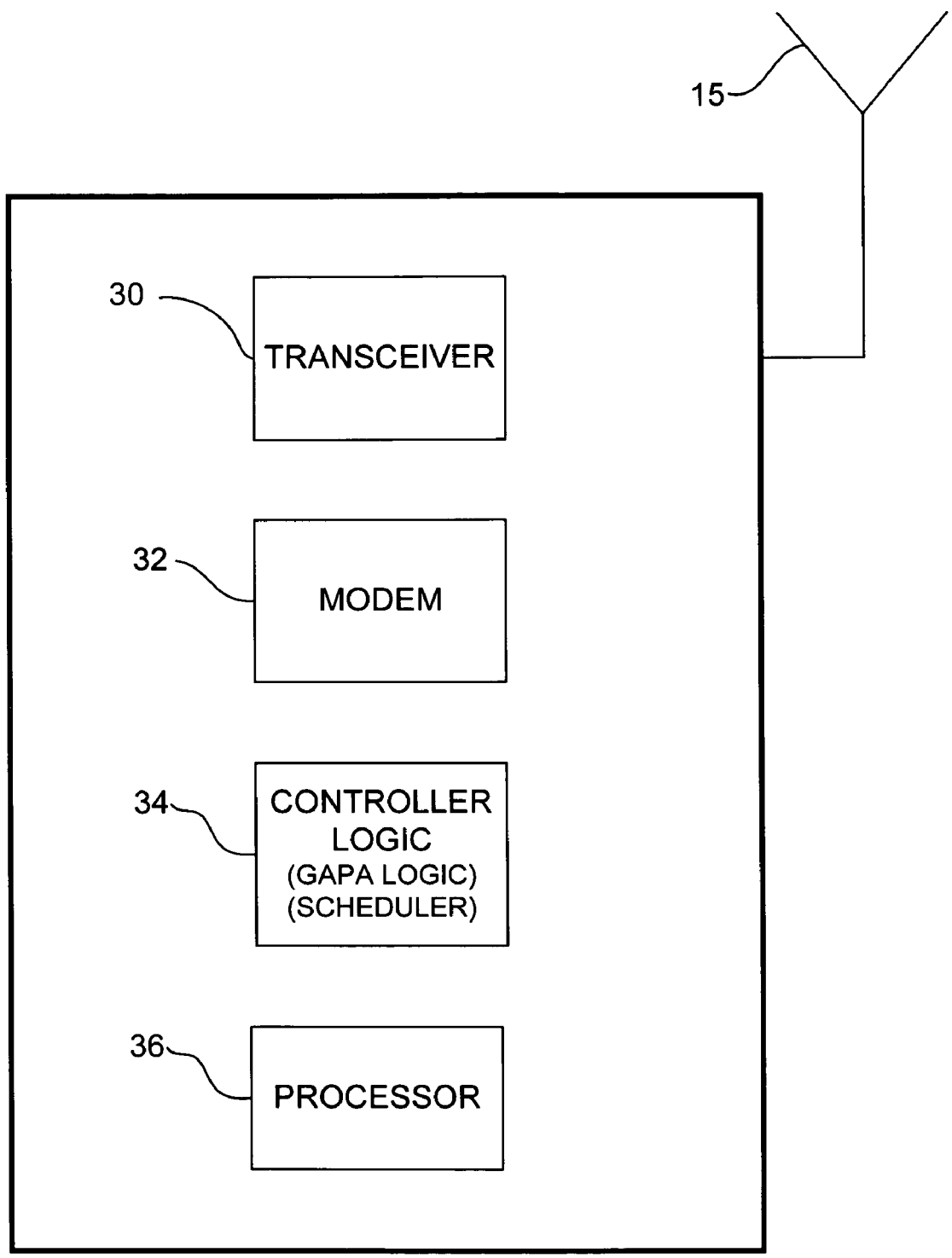
FIG. 2 depicts an example of a wireless device useful in implementing embodiments described herein.

FIG. 2 is a block diagram illustrating an example of a wireless device (e.g., AP 12, client device 14) that may be used to implement embodiments described herein. The device includes a transceiver 30, modem 32, controller logic 34, and processor 36. The transceiver 30 comprises a combined transmitter and receiver, however, the device may also be configured with a separate transmitter and receiver. The modem 32 is configured to implement modulation and framing of signals according to the applicable communication protocol or standard (e.g., IEEE 802.11) under control of the controller logic 34. The controller logic 34 includes logic to implement embodiments described herein from the perspective of the AP 12 or client device 14. The controller logic 34 may be encoded in one or more tangible media for execution by processor 36. The controller logic 34 may be in the form of software executed by a processor, digital signal processor instructions, or in the form of fixed logic in an integrated circuit, for example. It is to be understood that the wireless device shown in FIG. 2 and described above is only one example and that different configurations of devices may be used without departing from the scope of the invention.

Figure 3:
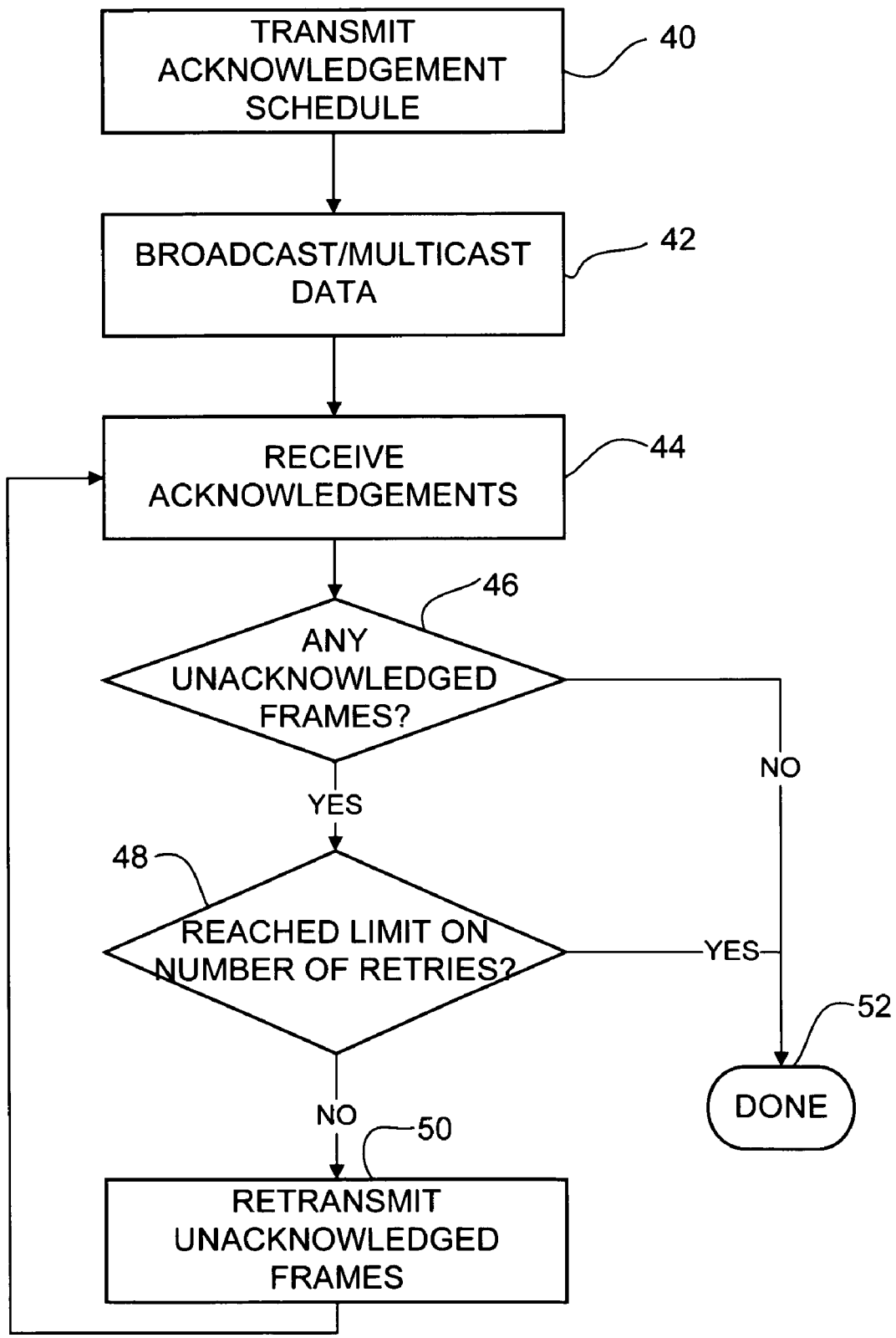
FIG. 3 is a flowchart illustrating a process for broadcast or multicast transmissions with acknowledgment scheduling.

FIG. 3 is a flowchart illustrating one example of a process for broadcast or multicast transmissions with acknowledgement scheduling. At step 40, the AP 12 schedules acknowledgements from the destination devices 14, generates an acknowledgement schedule 22, and transmits the acknowledgement schedule to the destination devices. At step 42, the AP 12 transmits (broadcasts or multicasts) a data frame (or an aggregate of multiple data frames) 20 to the client devices 14. Destination devices 14 that receive the acknowledgement schedule 22 and the data 20, transmit an acknowledgement to the AP 12 according to the acknowledgement schedule. The AP 12 receives and processes acknowledgements from the destination devices 14 at step 44. If there are any unacknowledged frames (step 46) and a limit as to the number of retransmissions (retries) has not been reached (step 48), the AP 12 retransmits the unacknowledged data to the one or more client devices 14 that did not transmit an acknowledgement (step 50). As described below, the AP 12 may also send out a new acknowledgement schedule 22 for the devices for which acknowledgements have not been received.

It is to be understood that the process shown in FIG. 3 and described above is only one example and that steps may be added or deleted without departing from the scope of the invention. For example, the AP 12 may not receive any acknowledgements at step 44, in which case the entire frame is retransmitted to all client devices 14. Details, in accordance with one embodiment, of the steps shown in FIG. 3 are described below.

In one embodiment, Power-Save Multi-Poll (PSMP) is used to schedule PSMP ACKs from the intended destination devices. PSMP is a relatively new power save protocol described in IEEE 802.11n. A PSMP frame is a MAC management action frame with a destination address set to broadcast, which provides a time schedule for downlink transmission and uplink transmission to be used by the PSMP transmitter and receivers. The downlink transmission time is a period of time described by the PSMP frame and which is intended to be used for the reception of frames by PSMP receivers. The uplink transmission time is a period of time described by the PSMP frame and which is intended to be used for the transmission of frames by PSMP receivers. After an initial contention period, within one transmit opportunity (TXOP), the PSMP mechanism provides a downlink period followed by a polled uplink period. In case of an error in one PSMP frame (or any other case), it can be followed by another PSMP frame for retransmissions. This cascade of PSMP frames constitutes a PSMP burst.

As described further below, APs use PSMP during their own transmit opportunity (TXOP) to send an acknowledgement schedule to the destination devices. PSMP provides a time schedule that is used by the AP 12 and its PSMP-capable stations (destination devices 14). The amount of time used for downlink and uplink transmissions are defined as part of the PSMP frame. PSMP-DTT (downlink transmission time) is the time scheduled for the AP 12 to transmit frames to the destination devices 14. PSMP-UTT (uplink transmission time) is the time scheduled for destination devices 14 to transmit frames to the AP 12.

In one embodiment, a new ACK policy is defined, which is referred to herein as group-addressed PSMP ACK (GAPA). The PSMP feature is a multiple traffic ID block acknowledgment (MTBA) mechanism that includes both source address (SA) (transmitter address (TA)) and destination address (DA) (receiver address (RA)). In one embodiment, a capability bit is created in a high throughput (HT)-capability information element (IE) to advertise support for this ACK policy or elsewhere such as the Extended Capabilities IE. The AP 12 stores data that enumerates all client devices 14 that are part of a group of intended destination devices. This stored data also identifies which client devices are GAPA devices (i.e., configured for group-addressed PSMP ACK operation) and which devices are legacy devices (i.e., incapable or not configured for GAPA operation).

Particular values of traffic stream identifier (TID) may be used within the PSMP frame to identify use of the group-addressed PSMP ACK in transmissions (e.g., a value between and including 8 and 15). The values are recognized by client devices that are group-addressed PSMP ACK capable after a prior frame exchange to establish the association between the multicast address and TID. For devices that are not group-addressed PSMP ACK capable, only the legacy MC/BC mechanism is used (i.e., no acknowledgements are sent).

In one embodiment, a PSMP-DTT frame is used to multicast or broadcast a data frame (or aggregated data frames) between IEEE 802.11n devices and PSMP-UTT frames are used to schedule PSMP ACKs for the destination of each member of the broadcast or multicast group. PSMP ACKs are not scheduled for stations that do not support group-addressed PSMP ACK. If the broadcast/multicast data traffic is periodical, scheduled PSMP may be used.

If a PSMP ACK for any frames sent in the PSMP-DTT phase is not received from any destination device that is group-addressed PSMP ACK capable, a subsequent PSMP sequence within the PSMP burst or a new unscheduled PSMP sequence is initiated using the PSMP-DTT to retransmit the unacknowledged frames of the broadcast/multicast data frame in a PSMP-DTT (steps 46 and 50 of FIG. 3). Within the PSMP frame immediately before the PSMP-DTT, the schedule of acknowledgements is sent for the group-addressed PSMP ACK capable client devices from which PSMP ACKs were not received. The schedule reserves times in the PSMP-UTT. In one embodiment, the AP 12 may employ rate adaptation for retransmission of the data, thereby facilitating the choice of the highest possible data rate.

The unscheduled PSMP (retransmitted PSMP) may be repeated up to a maximum number of retries (e.g., 2, 3, 4, 5) (steps 48 and 50 of FIG. 3). Upon successfully receiving fragments from a PSMP-DTT frame, the client device 14 acknowledges these fragments with a PSMP ACK within its scheduled PSMP-UTT.

In order to avoid an undue number of retries, if a particular client device repeatedly does not respond with PSMP ACKs (e.g., no PSMP ACKs 5 times in a row), the AP can remove that client device from the group of intended destination devices. For example, if retries are exhausted for a specific client device (a threshold number of PSMP bursts in a row), the AP 12 may conclude that the client device 14 has roamed away, been turned off, etc. ("disappeared"). The client device 14 may be removed by canceling the TID or by disassociation with that client device. For example, the AP 12 may decline participation by the client device 14 in the multicast group, or no longer send retries if only disappeared devices have not acknowledged the multicast data.

In one embodiment, duplication detection for GAP-enabled devices is achieved by using the same sequence number for all retries and using duplicate detection even for MC/BC frames. Legacy-safe transmission of duplicates is achieved as follows. A special retry address is assigned for each MC and the BC address, assigned by the AP and distributed by the AP to the client when the client requests GAPA operation. The broadcast/multicast data is only retransmitted to the special retry address. Retransmissions of BC frames (MPDUs) are transmitted via a special "BC retry" MAC address such as "ff-ff-ff-ff-ff-fe" using the above conditions. A client device accepts a GAPA MAC address only if the device is configured for GAPA. The GAPA techniques may be harmonized with legacy broadcast/multicast techniques if broadcast/multicast traffic was sent conventionally first (possibly over PSMP), then retries were sent to the special multicast MAC address.

Figure 4:
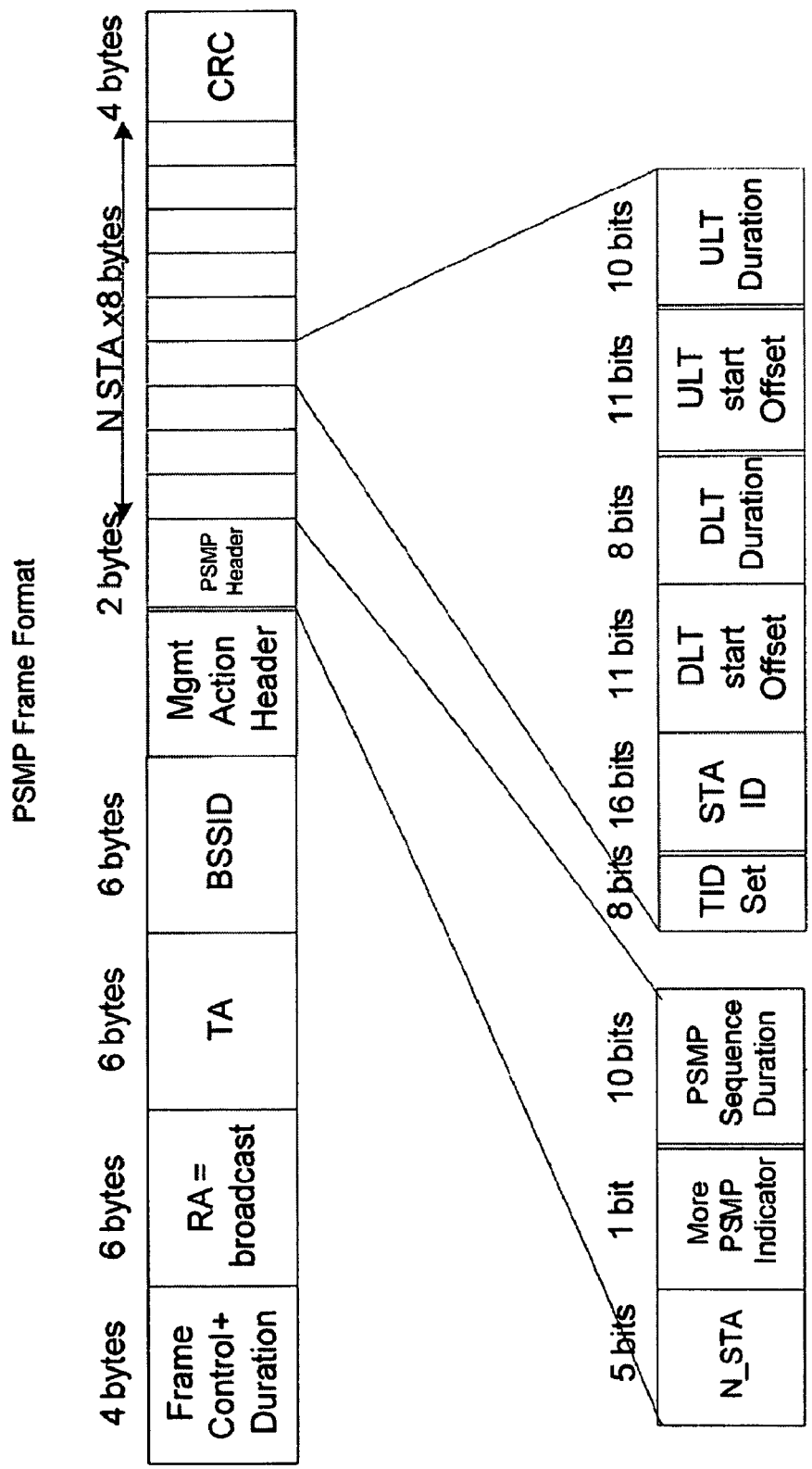
FIG. 4 illustrates an example of a power save multi-poll (PSMP) frame format.

Referring now to FIG. 4, one example of a PSMP frame format that may be used to implement the embodiments described herein is shown. The PSMP frame is a HT (High Throughput) management action frame and includes a management action header and a PSMP header. The PSMP frame further includes the following fields, as shown in FIG. 4: Frame Control/Duration, Receiver Address (RA=Broadcast), transmitter address (TA), and BSSID (basic service set identity). The frame also includes receiver information fields (N_STA) and a cyclic redundancy check (CRC) field.

The PSMP header includes N_STA, More PSMP Indicator, and PSMP Sequence Duration fields. The N_STA field indicates the number of station information fields present. The More PSMP field when set to 1 indicates whether this PSMP sequence is followed by another PSMP sequence and vice versa. The PSMP Sequence Duration field indicates the duration of the current PSMP sequence that is described by the PSMP frame in units of 8 μs, relative to the end of the PSMP frame.

The station information fields include a TID Set, STA_ID, DLT start offset, DLT duration, ULT start offset, and ULT duration, for each station. The TID set field is for the flag that specifies a group-addressed PSMP ACK policy for the BC/MC traffic identifier. The STA_ID field is the association identified for the station. The DLT start offset field indicates the state of the MPDU (MAC (medium access control) protocol data unit) that has the downlink data of the station. The offset is specified relative to the end of the PSMP frame. The DLT Duration field indicates the end of the downlink data of a station relative to the start of the MPDU that contains the first frame destined to the station. The ULT start offset field indicates the relative start time of the PSMP-UTT. The ULT duration field indicates the maximum length of the PSMP-UTT for a station.

Figure 5:
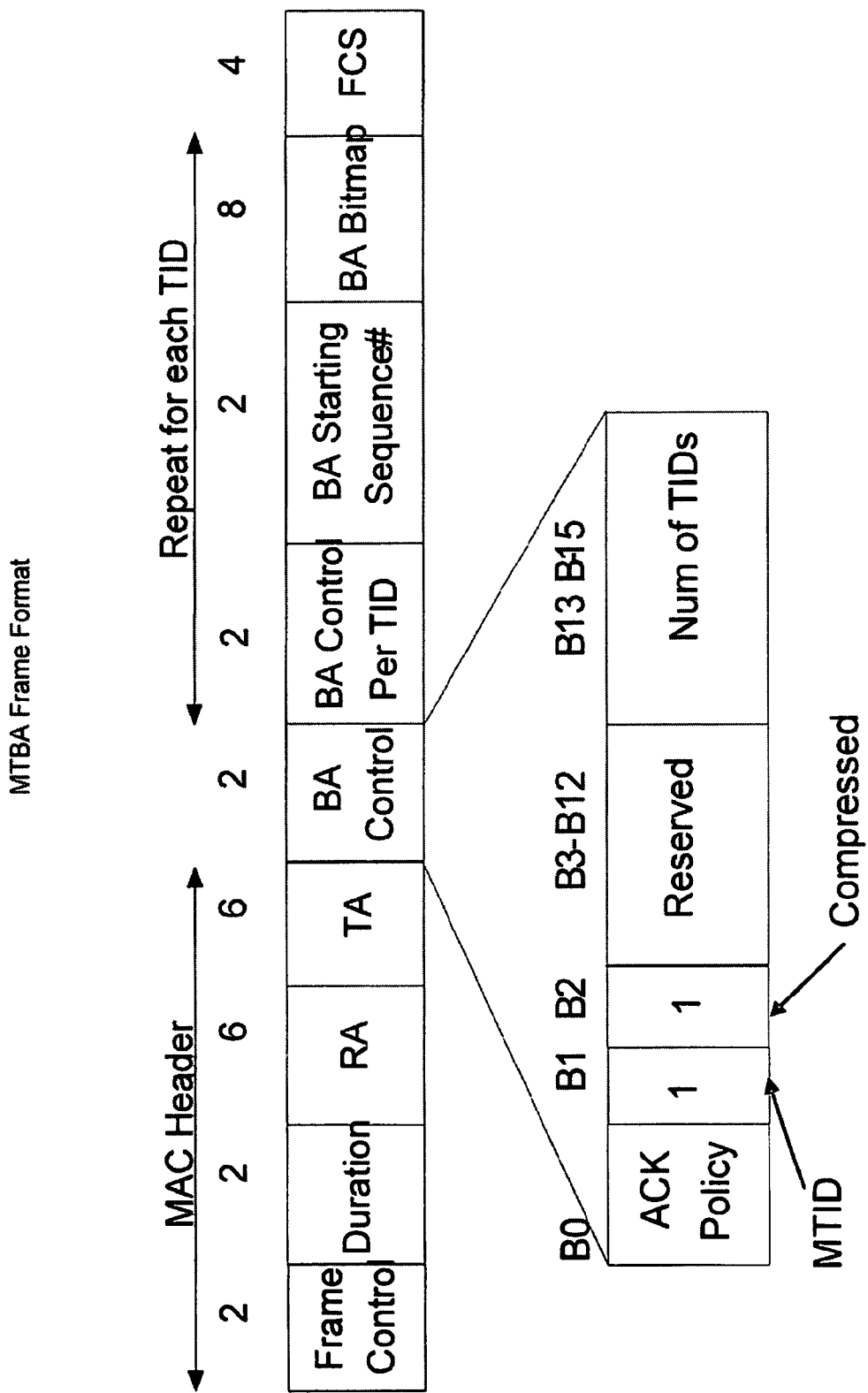
FIG. 5 illustrates an example of a multiple traffic ID block acknowledgement (MTBA) frame format.

FIG. 5 illustrates an example of an MTBA frame format. The frame includes a MAC header comprising Frame Control, Duration, RA (receiving address) and TA (transmitting address) fields. The header is followed by a BA (block acknowledgement) control field. In one embodiment, the BA control field identifies the group-addressed PSMP ACK policy, MTID and number of TIDs. The frame further includes, for each TID, BA Control (per TID), BA starting sequence, BA bitmap, and FCS.

It is to be understood that the PSMP and MTBA frame formats shown in FIGS. 4 and 5 and described above are provided only as examples and that other frame formats may be used without departing from the scope of the invention.

Figure 6:
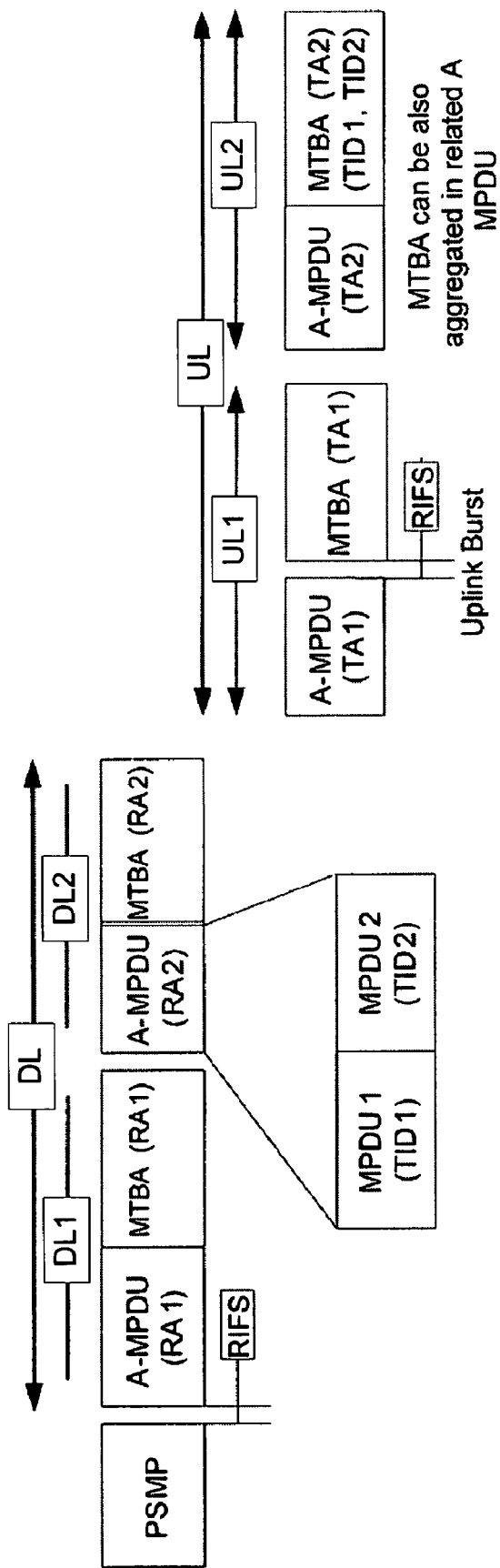
FIG. 6 illustrates an example of a sequence for employing group-addressed PSMP acknowledgements.

Referring now to FIG. 6, an example illustrating a transmission sequence of PSMP and MTBA frames is shown. MTBA efficiently carries block acknowledgements (BAs) for multiple TIDs. PSMP schedules when a station receives and when it may transmit. Downlink acknowledgement is scheduled in the uplink and vice versa. Uplink data is acknowledged by the following PSMP sequence. FIG. 6 illustrates transmission of downlink frames (A-MPDU (aggregated-MAC (medium access control) protocol data unit) and MTBA) to two receiving stations RA1, RA2 during downlink 1 (DL 1) and DL 2. Each destination device 14 sends an uplink transmission (A-MPDU and MTBA) in uplink 1 (UL 1) and UL 2. MTBA frames can be aggregated in related A-MPDUs. For example, as shown in FIG. 6, the MTBA frame for UL 2 includes TID1 and TID2.

Figure 7:
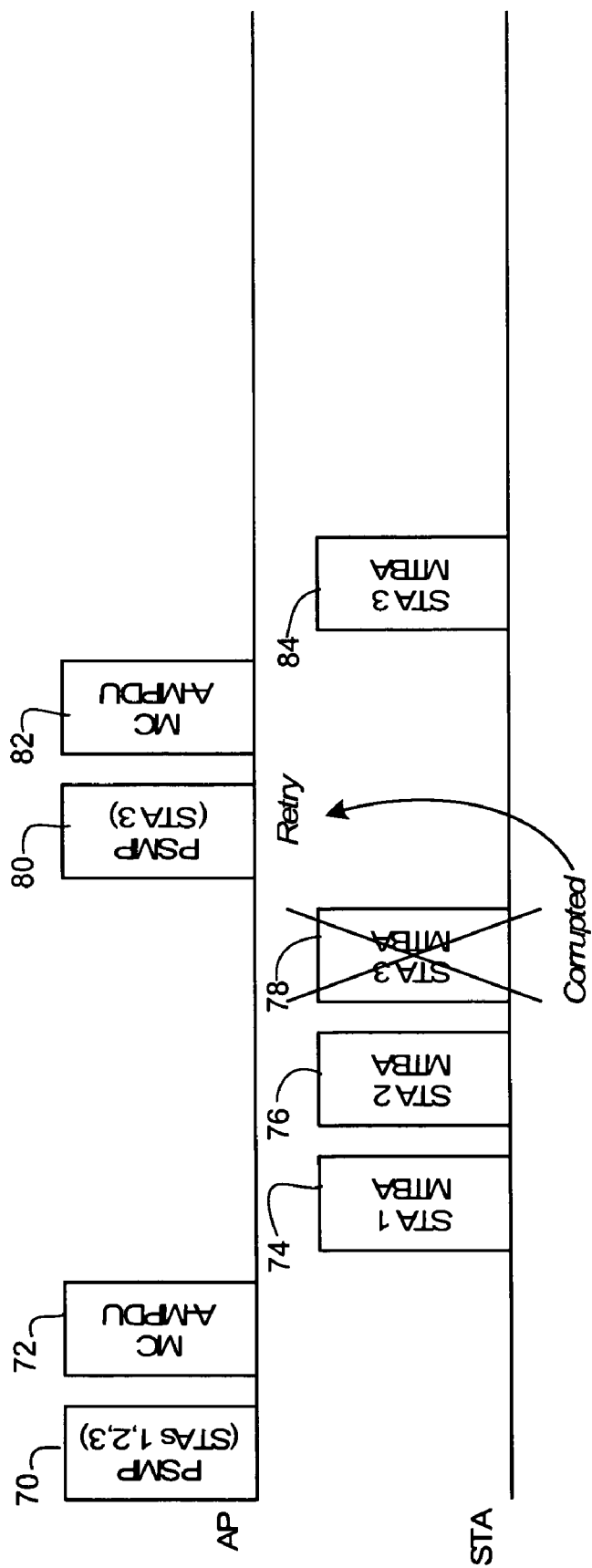
FIG. 7 illustrates an example of a timing diagram for group-addressed PSMP acknowledgements.

FIG. 7 illustrates an example of the timing of transmittal of PSMP and MTBA frames. At 70, the AP 12 broadcasts/multicasts the acknowledgement schedule information to the intended destination devices in a MPDU. Next, at 72, the AP 12 transmits one or more (e.g., multiple or aggregated) multicast frames via a scheduled PSMP burst. The PSMP burst comprises a first PSMP sequence (the DTT or downlink phase). Clients 14 transmit acknowledgements to the AP 12 when they receive the broadcast/multicast data. For example, at 74 and 76 clients (STAs) 1 and 2 transmit their acknowledgements according to the MTBA mechanism and based on the acknowledgement scheduling information contained in the frame at 72. However, as indicated at 78, client 3 did not transmit an acknowledgement. Therefore, at 80, the AP broadcasts/multicasts a subsequent PSMP sequence followed by acknowledgment scheduling information at 82. If the client device 3 receives this retransmission, it transmits an acknowledgement at 84. If the client device 14 does not receive the retransmission after a desired number of retransmission attempts, the AP 12 will make no further retries. The entire sequence shown in FIG. 7 preferably occurs within the same TXOP window.

As can be observed from the foregoing, the embodiments described herein provide numerous advantages. For example, greater efficiency is achieved from scheduling PSMP ACKs and not unnecessarily retransmitting a long video packet. Furthermore, robust rate adaptation is enabled while maintaining reliability through the use of a PSMP ACK from intended destination devices. System capacity is also improved since data is sent once and only retransmitted when necessary. The embodiments described herein also maintain good power save functionality and duplicate detection in the client devices. For longer data packets such as video data, the embodiments are very efficient in conversion to a unicast (UC) mode. Furthermore, since all stations receive data simultaneously, delay and delay jitter is reduced. The embodiments described herein are also compatible with legacy devices.

Although the method and apparatus have been described in accordance with the embodiments shown, one of ordinary skill in the art will readily recognize that there could be variations made to the embodiments without departing from the scope of the present invention. For example, it will be appreciated that although the present invention has been explained with reference to an IEEE 802.11 wireless network, it will find application in other types of network as well. Accordingly, it is intended that all matter contained in the above description and shown in the accompanying drawings shall be interpreted as illustrative and not in a limiting sense.

What is claimed is:

1. A method for broadcasting or multicasting data in a wireless network, comprising:
    receiving at a wireless device, data identifying a plurality of receivers configured to receive and utilize an acknowledgement schedule;
    scheduling acknowledgements from each of said plurality of receivers at the wireless device;
    transmitting an acknowledgement schedule to said plurality of receivers in a Power Save Multi-Poll (PSMP) frame prior to transmitting PSMP downlink transmission time frames, wherein said acknowledgement schedule reserves times in the PSMP uplink transmission time for transmittal of acknowledgements;
    broadcasting or multicasting data to said plurality of receivers;
    receiving said acknowledgements from one or more of said receivers in accordance with said acknowledgement schedule;
    processing said acknowledgements received from said receivers; and
    if said acknowledgement is not received from one or more of said receivers, generating and transmitting a new acknowledgement schedule for said one or more receivers and retransmitting at least a portion of said data only to said one or more receivers, and repeating said transmitting a new acknowledgement schedule and retransmitting at least a portion of said data if said acknowledgement is not received, up to a specified maximum number of retries, and removing said one or more receivers from a group if an acknowledgement is not received.

2. The method of claim 1 wherein said data is aggregated in a MAC (medium access control) protocol data unit (MPDU).

3. The method of claim 1 wherein said PSMP frame includes a traffic identifier field indicating a broadcast or multicast group utilizing a group-addressed PSMP acknowledgement policy and wherein removing said one or more receivers from a group comprises removing said one or more receivers from said broadcast or multicast group.

4. The method of claim 1 wherein each of said plurality of receivers are configured to transmit said acknowledgements according to said acknowledgement schedule and one or more legacy receivers receive said broadcast or multicast data without transmitting said acknowledgement, said legacy receivers not included in said acknowledgement schedule.

5. The method of claim 1 further comprising receiving said acknowledgments in multiple traffic ID block acknowledgement (MTBA) frames each comprising a transmitter address and a receiver address.

6. The method of claim 1 wherein said data is multicast or broadcast data comprising video and audio traffic.

7. The method of claim 1 wherein retransmitting said data comprises retransmitting a MAC (medium access control) protocol data unit MPDU not received by said one or more receivers.

8. The method of claim 1 wherein said new acknowledgement schedule comprises only addresses of said one or more receivers from which an acknowledgement was not received.

9. The method of claim 1 wherein said data is retransmitted using the same sequence number for all retries.

10. The method of claim 1 further comprising assigning a retry address for a broadcast or multicast address used for retransmitting said data and configured such that data transmitted to said retry address is only accepted by receivers configured to transmit said acknowledgements.

11. The method of claim 1 further comprising employing rate adaptation for retransmission of said data to facilitate a choice of a highest available data rate.

12. The method of claim 1 wherein said retransmitting occurs in a same transmission opportunity window.

13. An apparatus for broadcasting or multicasting data in a wireless network, comprising:
    a scheduler operable to receive data identifying a plurality of receivers configured to receive and utilize an acknowledgement schedule, schedule acknowledgements from each of said plurality of receivers, and generate an acknowledgement schedule;
    a transmitter configured for transmitting said acknowledgement schedule in a Power Save Multi-Poll (PSMP) frame and broadcasting or multicasting data to said plurality of receivers;
    a processor operable to process said acknowledgements received from said receivers and employ rate adaptation for retransmission of said data to facilitate a choice of a highest available data rate; and
    a controller configured to arrange for retransmittal of at least a portion of said data to one or more of said receivers if said acknowledgement is not received from said one or more receivers;
    wherein said scheduler is configured to generate a new acknowledgement schedule for said one or more receivers if said acknowledgement is not received from said one or more receivers and repeat transmitting a new acknowledgement schedule and retransmitting at least a portion of said data if said acknowledgement is not received, up to a specified maximum number of retries, and remove said one or more receivers from a group if an acknowledgement is not received.

14. The apparatus of claim 13 wherein said PSMP frame includes a traffic identifier field indicating a broadcast or multicast group utilizing a group-addressed PSMP acknowledgement policy.

15. The apparatus of claim 13 wherein said acknowledgements are received in multiple traffic ID block acknowledgement (MTBA) frames each comprising a transmitter address and a receiver address.

16. The apparatus of claim 13 wherein receiving said data identifying a plurality of receivers configured to receive and utilize said acknowledgement schedule comprises receiving a message comprising a capability bit in a high throughput-capability information element to advertise support for said acknowledgement schedule.

17. The apparatus of claim 13 wherein said acknowledgement schedule comprises an uplink transmission start offset and duration for each of said receivers.

18. The apparatus of claim 13 wherein removing said receiver from said group comprises removing a traffic identifier associated with said receiver from said group.

19. The apparatus of claim 13 wherein the processor is configured for duplication detection and wherein the same sequence number is used for said retries.

20. An apparatus for broadcasting or multicasting data in a wireless network, comprising:
   means for receiving data identifying a plurality of receivers configured to receive and utilize an acknowledgement schedule;
   means for scheduling acknowledgements from each of said plurality of receivers and transmitting an acknowledgement schedule in a Power Save Multi-Poll (PSMP) frame to said plurality of receivers prior to transmitting PSMP downlink transmission time frames, wherein said acknowledgement schedule reserves times in the PSMP uplink transmission time;
   means for broadcasting or multicasting data to said plurality of receivers;
   means for receiving acknowledgements from one or more of said receivers in accordance with said acknowledgement schedule and processing said acknowledgements received from said receivers; and
   means for generating and transmitting a new acknowledgement schedule for one or more receivers and retransmitting at least a portion of said data only to said one or more of said receivers if said acknowledgement is not received from said one or more receivers and repeating said transmitting a new acknowledgement schedule and retransmitting at least a portion of said data if said acknowledgement is not received, up to a specified maximum number of retries, and removing said one or more receivers from a group if an acknowledgement is not received.

21. The apparatus of claim 20 wherein said acknowledgements are received in multiple traffic ID block acknowledgement (MTBA) frames each comprising a transmitter address and a receiver address.

\* \* \* \* \*